Sept. 12, 1944. C. L. THOMAS ET AL 2,358,039
FLUID CATALYST PROCESS
Filed Oct. 27, 1941 2 Sheets-Sheet 1

INVENTORS
CHARLES L. THOMAS
JOSEPH D. DANFORTH
BY
ATTORNEY

Sept. 12, 1944.　　C. L. THOMAS ET AL　　2,358,039
FLUID CATALYST PROCESS
Filed Oct. 27, 1941　　2 Sheets-Sheet 2

INVENTORS
CHARLES L. THOMAS
JOSEPH D. DANFORTH
BY
ATTORNEY

Patented Sept. 12, 1944

2,358,039

UNITED STATES PATENT OFFICE 2,358,039

FLUID CATALYST PROCESS

Charles L. Thomas and Joseph D. Danforth, Chicago, Ill., assignors to Universal Oil Products Company, Chicago, Ill., a corporation of Delaware Application October 27, 1941, Serial No. 416,671

8 Claims. (Cl. 196—50)

This invention relates to a process for contacting a powdered solid with two different fluids. Our invention is particularly useful and advantageous in processes wherein a catalyst is used to promote a chemical reaction, said catalyst thereby becoming contaminated and requiring regeneration with a gaseous regenerating medium. The processes to which our invention is applicable include a number of hydrocarbon conversion reactions such as catalytic cracking, catalytic dehydrogenation, catalytic desulfurization and the like.

It is well known that catalysts used in promoting hydrocarbon conversions soon lose their activity due to the deposition of carbonaceous materials and it is common practice to regenerate these catalysts by burning these deleterious carbonaceous substances in a stream of air or other oxygen containing gases. Heretofore processes employing a powdered catalyst in the conversion of hydrocarbons were required to make a complete separation of the spent catalyst from the hydrocarbon reaction products, the contaminated catalyst so separated being reactivated in a separate reaction one, the gaseous products of regeneration and the reactivated catalyst then being separated in another series of separating zones.

The process of our invention differs markedly from the principal type of operation outlined above in that the hydrocarbon conversion zone and the catalyst reactivating zone are so connected that the products of regeneration and the hydrocarbon conversion products are mixed, the mixture going to a separation and recovery plant.

Figure 1:
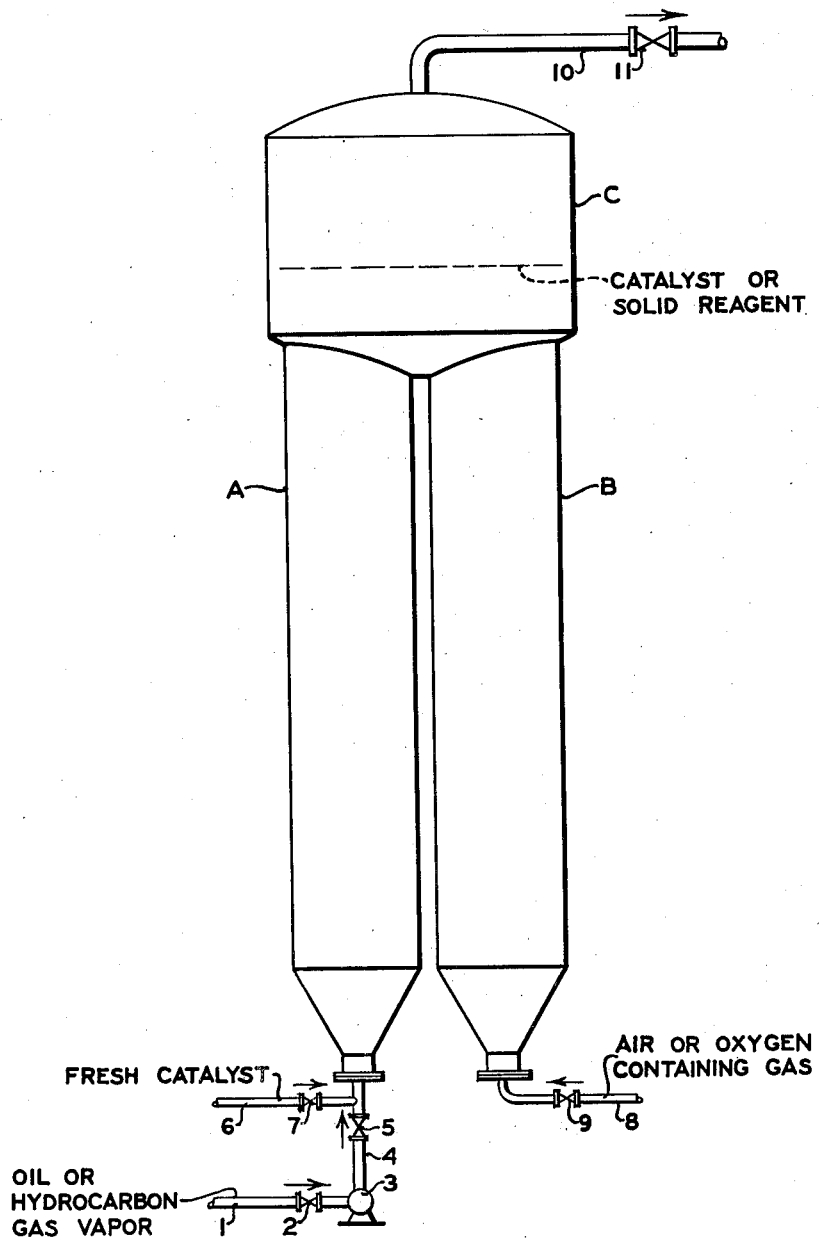

The accompanying drawings diagrammatically illustrate two forms of a reactor suitable for carrying out the process of our invention. The reactor shown in Fig. 1 consists of two legs A and B connected to a common head C. The charging stock which may consist of hydrocarbons is supplied to the system in fluid state by way of line 1, controlled by valve 2 which supplies pump 3 discharging through line 4, valve 5 into reactor A. An additional quantity of catalyst needed to make up for the portion being lost in the process is supplied to line 4 by way of line 6, controlled by valve 7. The temperature and pressure of the mixture in leg A depends upon the particular conversion process. In the catalytic cracking of high boiling hydrocarbons, for example, a temperature within the approximate limits of 800–950° F. with a pressure within the approximate limits of 5–25 pounds per square inch gauge might be used. In a catalytic reforming process or in a process for the dehydrogenation of paraffinic hydrocarbons somewhat higher temperatures would be used. The mixture of reactants and catalyst powder moves upwardly in reactor A, said mixture being in turbulent motion. The mixture of catalysts and reactants flows upwardly into compartment C wherein there is a sharp decrease in the density of the catalyst. The catalyst in compartment C presents the appearance of two phases with a relatively sharp line of demarcation between the two phases. The regenerating gas which in the case of a hydrocarbon conversion process would contain oxygen for the purpose of oxidizing the carbonaceous material deposited on the catalyst is supplied by way of line 8, controlled by valve 9. The mixture of regenerating gases and catalysts from reactor B are also in turbulent motion. The temperatures used in the reactivating zone depend upon the nature of the reactivation and may vary from 800–1300° F. if said reactivation consists in the oxidation of carbonaceous material. The pressure in leg B, of course, corresponds very nearly to that of leg A. The mixture of gaseous products of regeneration and gaseous reactants together with a certain amount of suspended catalyst powder is removed from compartment C by way of line 10, controlled by valve 11.

The time of contact of the reactants with the catalyst powder in container A varies with each particular conversion process. For example, in the cracking of higher boiling hydrocarbons to form gasoline, the time of residence of the hydrocarbons within the cracking zone is a matter of a few seconds, the higher the temperature of the cracking, the shorter the contact time. The time of contact of the gaseous regenerating medium in leg B is dependent upon the nature of the reactivation. When carbonaceous material is deposited on the catalyst the time of contact of the regenerating gases with the catalyst also depends upon the concentration of oxygen in the regenerating gas mixture. Owing to the heat evolved in the exothermic process for the oxidation of the carbonaceous material, it may be necessary to use a gas of controlled oxygen content to prevent an excessive temperature rise. This gas of controlled oxygen content may be obtained by mixing air with products of combustion. If pure air is used in the regenerating side of the reactor, it may be desirable to use cooling coils within this oxidation zone in order to prevent damage to the catalyst.

Temperatures as high as 1300° F. may be used without damage to the catalyst although in most cases it is desirable that the regeneration temperature does not exceed the processing temperature by more than 300-400° F.

Figure 2:
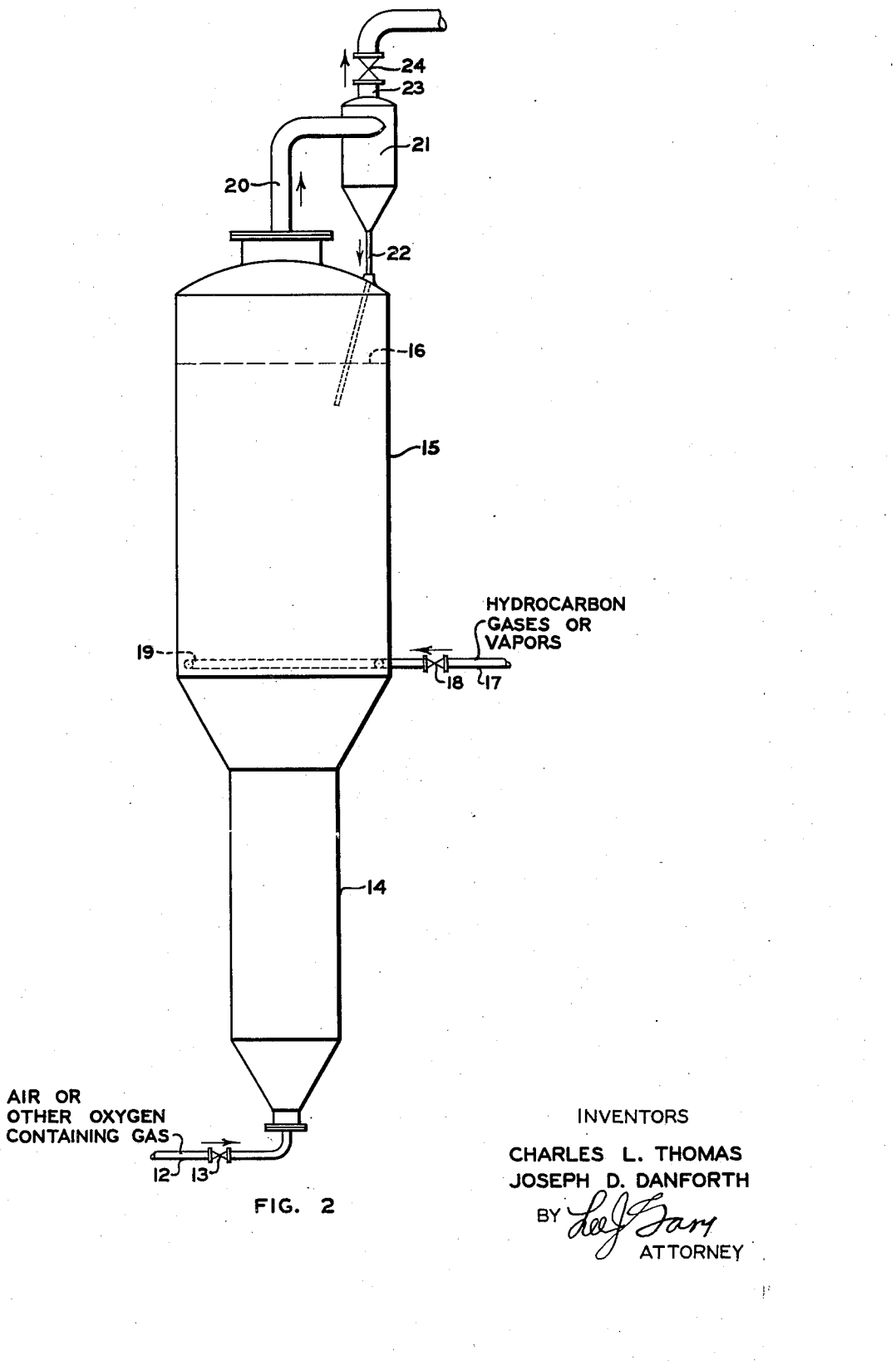

Fig. 2 illustrates another embodiment of our invention. In this method of operation the hydrocarbon conversion zone is superimposed on the catalyst regeneration zone, the two zones being in direct communication. The air or other oxygen containing gas is admitted to the system by way of line 12 and after passing through valve 13 is supplied to lower leg 14 of the reactor wherein the carbonaceous material deposited on the catalyst is removed by oxidation. The hydrocarbon conversion section of the reactor 15 is supported by the aforesaid leg 14, the entire system being filled by a powdered catalyst to a level indicated by numeral 16. The hydrocarbon gases, vapors or liquids are supplied to the system by way of line 17 and after passing through valve 18 enter distributing member 19. These fluid hydrocarbons flow upwardly from distributing member 19 through the dense mass of catalyst powder under conditions of temperature, pressure and time of contact so regulated as to obtain the desired conversion of the hydrocarbons. The oxygen concentration, time of contact and pressure of the regenerating gases are so regulated that the gaseous products of regeneration are substantially oxygen free by the time they come in contact with distributing member 19. In this way very little if any of hydrocarbon charging stock is oxidized by the oxygen admitted in the regenerating gases. The upward flow of the regenerating gases as well as the hydrocarbon vapors serves to maintain the catalyst powder in a continuous state of agitation, the mass of powder appearing somewhat like that of a boiling liquid. The gaseous products of regeneration and the hydrocarbons become mixed in section 15 of the reactor and the mixture of the hydrocarbon reaction products and gaseous products of regeneration are disengaged from the upper surface 16 of the dense mass of powdered catalyst. The gaseous mixture of entrained catalyst leaving the reactor system by way of line 20, enters cyclone separator 21 wherein the major portion of entrained catalyst powder is removed from the exit gases. The catalyst removed in cyclone separator 21 is returned to section 15 of the reactor by way of line 22, this line being filled with catalyst powder thus acting as a seal for the separator. The gaseous mixture leaves cyclone separator 21 freed from a greater portion of entrained catalyst and enters line 23, controlled by valve 24 and is thereafter directed to heat exchangers and system for recovery of products.

In some cases it may be desirable to introduce means for controlling the temperature within the catalyst regeneration zone or the hydrocarbon conversion zone. For example, a coil may be disposed within the catalyst regeneration zone through which some cooling media, such as water or the hydrocarbon charging stock, is passed in order to prevent an excessive temperature rise during the oxidation of the carbonaceous material on the catalyst. The use of such a cooling means in the catalyst regeneration zone is often unnecessary as air may be diluted with inert gases such as steam or products of combustion and the temperature within the regeneration zone controlled in this manner. It is often possible by controlling the relative amount of regeneration gases to the hydrocarbon charging stock to so regulate the carbonaceous material deposited on the catalyst that pure air may be used as the regeneration gas.

The process of our invention has a number of advantages over the fixed bed type of catalyst cracking process. In the fixed bed type catalytic cracking process, the catalyst varies considerably in its activity during the processing period. With this type of operation it is very difficult to prevent over cracking in the early portion of the process period with under cracking toward the end of the period. When utilizing the process of our invention, owing to the mixing of the powdered catalyst due to the movement of the vaporous reactants and the movement of the regenerating gases, the catalyst in the conversion zone may readily be maintained at an average degree of activity which is the optimum for the process. It may readily be seen from the description of the process that the catalyst being employed in conversion is never entirely free from carbonaceous material and at the same time never completely spent. When utilizing a catalyst which is completely reactivated, the catalytic action is excessive, that is, the ratio of carbon to gasoline formed is higher than when using a catalyst which has a small amount of carbon deposited on its surface. If the amount of carbon deposition is so great as to completely deprive the catalyst of its ability to promote hydrocarbon conversions, the reaction will tend to become purely thermal in character with a consequent decrease in the octane number of the product and the formation of a larger proportion of normally gaseous products.

It is also within the scope of our invention to provide heating means in the conversion side of the reactor. For such processes as the catalytic cracking of hydrocarbons which are only moderately endothermic in character, adiabatic reaction zones are usually preferred owing to their simplicity of construction and the reduced cost of operation. However, with certain processes like the dehydrogenation of normally gaseous paraffins such as butanes to form butenes, it is usually desirable to supply heat in the dehydrogenation step. This heat may be supplied by means of hot combustion gases or in the form of heated molten inorganic salts, reactor A in such cases being equipped with heating coils.

In the catalytic cracking of higher boiling hydrocarbons the time of contact is so selected that as much as 60% of the charging stock may be converted to gasoline per pass. Greater conversions than this per pass usually result in an unfavorable ratio of carbon and normally gaseous products to gasoline. The amount of carbon formed during the cracking operation depends greatly on the charging stock and may vary from 0.5 to 10% by weight of feed. When employing the silica-alumina type catalyst, the octane number of the gasoline obtained is around 80 A. S. T. M. motor method. In the dehydrogenation of butanes the time of contact is so selected that about 30 to 50% of butanes are dehydrogenated to butenes per pass. When employing this process for the catalytic reforming of straight run gasolines using catalysts of the alumina-chromium oxide or alumina-molybdenum oxide type, the time of contact is so adjusted that the gasolines having an octane number varying from 75 to 85 A. S. T. M. motor method are obtained. The percentage liquid recovery obtainable with this type of end product varies with the charging stock but may be equal to about 80 volume percent.

The process of our invention is not to be considered to be limited to catalytic conversion of hydrocarbons but may also be applied to the process of desulfurization or processes in which a higher boiling hydrocarbon fraction is vaporized in the presence of a powdered solid, the solid being used to absorb the asphalt or carbon forming constituents present in said fraction. In general the process of our invention may be applied to any operation wherein a solid is selected to contact successively in two different zones two different gases or in its more general aspects two fluids, as for example a liquid and a gas or in certain cases two different liquids. There are, of course, certain processes in which our invention is not applicable. For example, in dehumidifying air for air conditioning where the solid is a drying agent, our invention could not be used for the process would result in no net drying of the air. In other words, while the moisture would be removed from the air by the solid in one of the reactors, for example, A, this moisture would in turn be released in reactor B with no net beneficial result.

Our process might be applied to the hydrogenation of heavy oils using an iron-iron oxide catalyst or reagent. In this process the heavy oil and steam would be introduced to one reaction zone wherein the steam would react with the iron to form iron oxide and hydrogen, the hydrogen liberated hydrogenating the hydrocarbons to produce a saturated product. In the regeneration zone hot reducing gases such as natural gas could be used to reduce the iron oxide to iron. The temperature in the reduction zone might be in the range of 900–1300° F. while that in the reaction zone might vary from 800–1100° F. The pressure in the destructive hydrogenation process would usually be superatmospheric, for example around 500 pounds per square inch.

We claim as our invention:

1. A process for effecting catalytic reactions which comprises maintaining freely movable powdered catalyst in a reaction zone and in an adjacent regenerating zone, said zones being merged together at adjacent ends thereof to form a region common to both, simultaneously introducing a vaporous reactant to the lower portion of the reaction zone and a regenerating gas to the lower portion of the regenerating zone at sufficient velocity to effect movement of the catalyst in said zones and upward flow of the reactant and regenerating gas through the respective zones, and transferring powdered catalyst from each of said zones to the other through said region of merger common to the two zones.

2. A process for effecting catalytic reactions which comprises maintaining freely movable powdered catalyst in a reaction zone and in an adjacent regenerating zone, said zones being merged together at adjacent ends thereof to form a region common to both, simultaneously introducing a vaporous hydrocarbon reactant to the lower portion of the reaction zone and an oxygen-containing regenerating gas to the lower portion of the regenerating zone at sufficient velocity to effect movement of the catalyst in said zones and upward flow of the reactant and regenerating gas through the respective zones, effecting a carbon-forming reaction of the hydrocarbon in the reaction zone while burning carbonaceous matter from carbonized catalyst in the regenerating zone, and transferring through said region common to the two zones reactivated catalyst from the regenerating zone to the reaction zone and carbonized catalyst from the reaction zone to the regenerating zone.

3. The process as defined in claim 2 further characterized in that said reactant is a hydrocarbon oil which is subjected to catalytic cracking conditions in said reaction zone.

4. A process for effecting catalytic reactions which comprises maintaining freely movable powdered catalyst in a reaction zone and in an adjacent regenerating zone, said zones being merged together at adjacent ends thereof to form a region common to both, simultaneously introducing a fluid reactant to the lower portion of the reaction zone and a regenerating gas to the lower portion of the regenerating zone at sufficient velocity to effect movement of the catalyst in said zones and upward flow of the reactant and regenerating gas through the respective zones, and transferring powdered catalyst from each of said zones to the other through said region of merger common to the two zones.

5. A process for effecting catalytic reactions which comprises maintaining freely movable powdered catalyst in a reaction zone and in an adjacent regenerating zone, said zones being merged together at adjacent ends thereof to form a region common to both, simultaneously introducing a hydrocarbon reactant to the lower portion of the reaction zone and an oxygen-containing regenerating gas to the lower portion of the regenerating zone at sufficient velocity to effect movement of the catalyst in said zones and upward flow of the reactant and regenerating gas through the respective zones, effecting a carbon-forming reaction of the hydrocarbon in the reaction zone while burning carbonaceous matter from carbonized catalyst in the regenerating zone, and transferring through said region common to the two zones reactivated catalyst from the regenerating zone to the reaction zone and carbonized catalyst from the reaction zone to the regenerating zone.

6. The process as defined in claim 5 further characterized in that said reactant is a hydrocarbon oil which is subjected to catalytic cracking conditions in said reaction zone.

7. The process as defined in claim 5 further characterized in that said reactant is a dehydrogenatable hydrocarbon which is subjected to catalytic dehydrogenating conditions in said reaction zone.

8. The process as defined in claim 5 further characterized in that said reactant comprises hydrocarbons boiling in the gasoline range which are subjected to catalytic reforming conditions in said reaction zone.

CHARLES L. THOMAS.
JOSEPH D. DANFORTH.